United States Patent Office 3,511,725
Patented May 12, 1970

3,511,725
SOLID PROPELLANT CONTAINING CROSS-LINKED DIAMINE-TERMINATED POLYGLYCOL
Don L. Stevens, Sanford, and Harold E. Filter, Midland, Mich., assignors to The Dow Chemical Company, Midland, Mich., a corporation of Delaware
No Drawing. Filed Aug. 16, 1965, Ser. No. 480,840
Int. Cl. C06d 5/00
U.S. Cl. 149—19       5 Claims

ABSTRACT OF THE DISCLOSURE

A solid propellant which comprises a fuel, oxidizer and a novel binder, the binder being a reaction product of a diamine terminated polyglycol and a cross-linking agent wherein the polyglycol has been cross-linked through the amine groups.

---

This invention relates to rocket propellants and more particularly to solid rocket propellant formulations having a novel polymeric binder based on polyglycols.

It is a principal object of the present invention to provide a solid rocket propellant having a novel binder which provides for homogeneity and integrity in the propellant grain as well as imparts thereto a high resistance to mechanical and thermal shock.

It is another object of the present invention to provide a binder for solid propellants that does not reduce the specific impulse (maximum thrust per pound) of the propellant.

These and other objects and advantages of the present invention readily will become apparent from the detailed description of the present invention presented hereinafter.

The solid propellant composition of the present invention comprises a fuel, oxidizer and a novel binder, the binder being a reaction product of diamine terminated polyglycols and a cross-linking agent wherein the polyglycols have been cross-linked through the amine groups.

More particularly the present propellant composition comprises a particulate solid fuel, e.g. aluminum, magnesium, beryllium, solid light metal hydrides such as, for example boron hydrides, aluminum hydride and beryllium hydride, an oxidizer, e.g. ammonium perchlorate, ammonium nitrate, hydrazinium diperchlorate, hydrazinium perchlorate, hydrazinium nitroformate, triaminoguanidinium azide and the like and a binder of a crosslinked amine terminated polyethylene-, polypropylene-, polybutylene glycol or copolymer of these polyglycols wherein the polyglycol amine has been cross-linked by curing with an epoxy based resin, an aziridine resin or a strong Lewis acid catalyst. Preferably, these polyglycols have a molecular weight of from about 200 to about 2000 or more.

The binder concentration in the propellant ranges from about 10 to about 50 weight percent of the total composition. The fuel-oxidizer components including the binder ordinarily are varied to provide a propellant having a fuel-oxidizer weight ratio of from about 0.8 to about 1.20 of that required stoichiometrically for fuel-oxidizer balance and preferably is substantially stoichiometrically balanced with respect to these materials; i.e. provides a fuel-oxidizer balance in the product. The actual weight proportions for any predetermined fuel-oxidizer combination to be employed in a propellant with the present novel binder system, therefore, will be determined for each fuel-oxidizer mixture. Although stoichiometrically fuel-oxidizer balanced compositions ordinarily will be employed, for certain uses and in some compositions it is to be understood that either fuel rich or oxidizer rich mixtures can be used.

Also, it is to be understood that the binder of the present invention can be used in hybrid propellants where the fuel components and binder are blended and cured into an integral mass which is reacted with an oxidizer from a separate source. "Reverse hybrids," where the binder and oxidizer are blended and cured into a composite body and this then reacted with fuel from a separate source, also can be prepared using the present novel binder system.

Amine capped, i.e. amine terminated polyglycols suitable for use in the present invention are the amines, preferably diamines, of straight and branched chain aliphatic polyglycols such as, for example, polyethylene, polypropylene and polybutylene, trifunctional polyglycols such as polyhydroxypropylglycerine, polytriols derived from ethylene oxide and propylene oxide, polymerized glycols such as hexylene glycol, 2-ethyl-1,3-hexanediol, 1,2,6-hexanetriol and the like.

Many of the polyglycol diamines have low viscosities (700–1200 cps. Brookfield viscosity at 20 r.p.m.) and when loaded even to 80–85 percent by weight solids, based on total composition in a solid propellant formulation, give compositions of lower viscosity than conventionally employed carboxyl containing polybutadienes, e.g. polybutadiene/acrylic acid copolymer, polybutadiene/acrylic acid/acrylonitrile terpolymer or carboxyl terminated polybutadiene, which are cross-linked through the carboxyl group with an epoxy resin and/or an aziridine resin. These conventionally employed binder materials are extremely viscous (23,000–30,000 cps. Brookfield viscosity at 20 r.p.m.) and, when loaded to 80–85 percent solids in a solid propellant formulation, result in a composition that must be pressure pumped into the molds or rocket engines at elevated temperatures, e.g. 60° C.

Blends of the present novel binder mixed with the conventional, more highly viscous binders, also have been found to be suitable for use in propellants.

Curing agents suitable for use in cross-linking the amine terminated polyglycols into solid, elastomeric structures are epoxy resins, aziridine resins (ethyleneimine resins), strong Lewis acid catalysts such as boron trifluoride, tin chloride, etc. and the like agents which will provide the desired cross-linked structure. Liquid and flexible epoxy and epoxy based resins, epoxidized sucrose materials, aziridine resins such as for example tris[1-aziridinyl] phosphine oxide and bis[1-(2-methyl)aziridinyl] phosphine oxide, and the like materals have been found to be particularly suitable curing agents to promote the cross-linking reaction.

The ratio of curing agent to polyglycol salt can be varied depending upon the amount of cross-linking required or desired in the final product. For elastomers, suitable for using as propellant binder, ordinarily the ratio of curing agent, i.e. cross-linking agent, to amine terminated polyglycol ranges from about 0.5 to about 2.5, and preferably from about 0.5 to about 1.25, based on the epoxide equivalent/amine hydrogen equivalent (AHE), of that required stoichiometrically for complete cross-linking; i.e. a ratio of 1.

The cross-linked elastomeric polymer products are prepared by mixing the amine terminated polyglycol with a predetermined amount of the curing agent. The resulting mixture is cured at a temperature of from about room temperature to about 125° C. for a period of from about several minutes to about 48 hours or more. The actual time of cure to be employed for a given reaction mixture will depend on the nature and ratio of reactants, curing temperature and, to some extent, on the ultimate properties desired in the final cross-linked product.

When used as a binder in propellant formulations, the amine capped polyglycol, curing agent and other fuel and oxidizer components can be mixed, cast, extruded or otherwise formed into a propellant grain using mixing, formulating, forming and curing techniques generally employed in the solid propellant fabrication art. Conveniently, the liquid binder, curing agent, fuel and oxidizer components are mixed and stirred until a substantially homogeneous mix is obtained. Alternatively, the oxidizer and fuel components can be introduced separately or as a mixture into a continuously agitated mass of liquid binder and stirring can be continued after completion of the addition until the desired degree of homogeneity is achieved in the mix.

The cured products from the compositions of the present invention have high tensile strength and good elongation. By comparison, the cured propellant grains resulting from the use of conventional carboxyl containing polybutadiene binders have strength characteristics that are marginal at best, their full potential being limited by inadequate strain capability.

The following examples will serve to further illustrate the present invention but are not meant to limit it thereto.

EXAMPLE 1

A number of amine terminated polyglycols were reacted with various cross-linking agents and the blend cured to provide tough, elastomeric solids. In carrying out these studies predetermined quantities of an amine terminated polyglycol and a curing agent which provided for cross-linking through the amine groups were mixed at room temperature to provide a substantially homogeneous blend. This blend was then cast, ordinarily in a standard dumbbell mold, and cured. The strength characteristics of the resulting cured structure were measured using standard tensile, elongation and in some cases Shore hardness test techniques.

The pertinent data and results of these studies are reported in Table I.

EXAMPLE 2

Blends of a polyglycol diamine, D.E.R. 332 epoxy resin and other binder components were prepared by the procedure described in Example 1, cured and the tensile strength, elongation and Shore "A" hardness determined. The results of a number of studies are presented directly hereinafter.

(a) A mixture of a polybutylenediamine (nominal molecular weight ~300) and D.E.R. 332 epoxy resin at an epoxide/AHE ratio of about 0.75 was blended with about 10 percent, based on total composition weight of polypropylene glycol bispropionic acid (nominal molecular weight ~1200). The resulting blend cured to a gel in about 40 minutes at 80° C. and upon post-curing at 125° C. for about 1 hour cured into a tough elastomer. The cured product had a tensile strength of 339 pounds per square inch when pulled at a rate of 20 inches per minute crosshead. Its elongation measured at a 20 inches per minute rate was 100 percent. The measured Shore "A" hardness was 50.

(b) A composition of this same polybutylene glycol diamine, D.E.R. 332 epoxy resin (epoxide/AHE ratio of 0.75) and 5 percent, based on the weight of the total composition, of a monocarboxyl terminated polybutadiene was blended and cured at 125° C. for about 1 hour. Tensile strength of the cured product was 451 pounds per square inch (20 inches/minute crosshead) and the elongation was 98 percent. The product had a Shore "A" hardness of 68.

(c) Polyethylene glycol diamine (nominal molecular weight ~200), D.E.R. 332 epoxy resin and glycidyl acrylate at an epoxide/AHE ratio of 1.5 and wherein the proportion of D.E.R. 332 resin to glycidyl acrylate was 1.25 to .25, based on available epoxide were blended, cured for 1 hour at 75° C. and 30 minutes at 125° C.

TABLE I

| Run No. | Polyalkylene Glycol Diamine Polyalkylene Group | Polyglycol mol. wt. (nominal) | Curing agent | Epoxide/ AHE (ratio) | Cure Time (hrs.) | Cure Temp. (° C.) | Tensile (p.s.i.) [1] | Elongation (percent) | Hardness Shore "A" |
|---|---|---|---|---|---|---|---|---|---|
| 1 | Ethylene | 200 | D.E.R. 332 | 1.25 | 1 | 125 | 2,270 | 72 | >95 |
| 2 | do | 200 | D.E.R. 332 | 1.5 | 1 | 125 | 1,130 | 86 | |
| 3 | do | 200 | Epoxy resin based on novolak | 1.25 | 1 | 125 | 1,690 | 76 | |
| 4 | do | 200 | Epoxidized sucrose | 1.25 | 1 | 125 | 403 | 45 | 74 |
| 5 | do | 200 | {D.E.R. 332 [2] / D.E.R. 736} | 1.0 | 1 | 125 | 638 | 80 | |
| 6 | Propylene | 750 | D.E.R. 332 | 0.5 | 1 | 125 | 184 | 56 | |
| 7 | do | 750 | D.E.R. 332 | 1.25 | 1 | 125 | 550 | 83 | 52 |
| 8 | do | 750 | D.E.R. 332 | 1.25 | 24 | 60 | 520 | 63 | 69 |
| 9 | do | 750 | D.E.R. 332 | 1.25 | 8 | 60 | 473 | 75 | |
| 10 | do | 750 | Epoxy resin based on novolak | 1.25 | 1 | 125 | 321 | 52 | 59 |
| 11 | do | 750 | do | 1.25 | 24 | 60 | 381 | 53 | 67 |
| 12 | do | 750 | do | 1.25 | 8 | 60 | 271 | 52 | |
| 13 | do | 750 | D.E.R. 332 | 0.75 | 1 | 125 | 365 | 47 | |
| 14 | do | 750 | D.E.R. 332 | 1.0 | 1.5 | 125 | [3] 110 | 66 | 38.5 |
| 15 | do | 1,200 | D.E.R. 332 | 1.0 | 1.5 | 125 | 48.9 | 124 | 14.1 |
| 16 | do | 1,200 | Epoxy resin based on novolak | 1.25 | 1 | 125 | 58.5 | 71 | |
| 17 | do | 1,200 | D.E.R. 332 | 1.25 | 24 | 60 | 69 | 55 | ~35 |
| 18 | do | 1,200 | D.E.R. 332 | 1.25 | 8 | 60 | 66 | 76 | |
| 19 | do | 1,200 | Epoxy resin based on novolak | 1.25 | 24 | 60 | 73 | 47 | ~37 |
| 20 | do | 1,200 | do | 1.25 | 8 | 60 | 51 | 40 | |
| 21 | do | 2,000 | D.E.R. 332 | 1.0 | 2 | 125 | [3] 19.3 | 82 | |
| 22 | do | 2,000 | D.E.R. 332 | 1.0 | 2 | 125 | 90 | 39 | 40 |
| 23 | do | 2,000 | D.E.R. 332 | 1.25 | 2 | 125 | 80 | 69 | 33 |
| 24 | do | 2,000 | Epoxy resin based on novolak | 1.25 | 1 | 125 | 81 | 64 | ~33 |
| 25 | do | 2,000 | Epoxy resin based on novolak [4] D.E.R. 732 | 1.31 | 1 | 125 | 46 | 90 | ~22 |
| 26 | do | 2,000 | Epoxidized sucrose | 1.25 | 1 | 125 | 86.5 | 38 | 44 |
| 27 | Butylene | 300 | D.E.R. 332 | 0.65 | 1 | 125 | 304 | 142 | 40 |
| 28 | do | 300 | D.E.R. 332 | 0.5 | 1 | 125 | 21.5 | 231 | |
| 29 | do | 300 | Epoxy resin based on novolak | 0.75 | 1 | 125 | 431 | 86 | |
| 30 | do | 500 | D.E.R. 332 | 0.5 | 1 | 125 | 72 | 148 | |
| 31 | do | 500 | D.E.R. 332 | 1.25 | 24 | 60 | 304 | 65 | 64 |
| 32 | do | 500 | D.E.R. 332 | 1.25 | 8 | 60 | 272 | 81 | |
| 33 | do | 500 | D.E.R. 332 | 1.25 | 1 | 125 | 152 | 70 | |
| 34 | do | 500 | Epoxy resin based on novolak | 1.25 | 1 | 125 | 233 | 68 | 47 |
| 35 | do | 500 | do | 1.25 | 24 | 60 | 242 | 45 | 52 |
| 36 | do | 500 | D.E.R. 732 | 1.00 | 1 | 125 | 43 | 43 | 30 |
| 37 | do | {[5] 500 / 1,000} | D.E.R. 332 | 1.25 | 1 | 125 | 168 | 72 | 55 |
| 38 | do | 1,000 | D.E.R. 332 | 0.65 | 1 | 125 | 58.6 | 68 | 28 |
| 39 | do | 1,000 | D.E.R. 332 | 0.75 | 1 | 125 | 97 | 52 | 48 |
| 40 | do | 1,000 | D.E.R. 332 | 1.25 | 1 | 125 | 117 | 59 | 51 |
| 41 | do | 2,000 | D.E.R. 332 | 0.50 | 1.5 | 125 | 16.3 | >423 | |
| 42 | do | 2,000 | D.E.R. 332 | 0.65 | 1 | 125 | ~41 | 126 | |
| 43 | do | 2,000 | D.E.R. 332 | 1.25 | 1 | 125 | 71 | 52 | 37 |

[1] 20 inches/minute crosshead, unless otherwise stated.
[2] 70 wt. percent D.E.R. 332 plus 30 wt. percent D.E.R. 736.
[3] 2 inches/minute crosshead speed.
[4] 1 part epoxy resin based on novolak plus 0.31 part D.E.R. 732 mixture per 1 part polyglycol, based on epoxide/AHE.
[5] Equal parts by weight.

The resulting elastomer had a tensile strength of 531 pounds per square inch (20 inches per minute crosshead), 164 percent elongation and a Shore "A" hardness of about 65.

EXAMPLE 3

(a) A one pound rocket motor was prepared having about 68 weight percent ammonium perchlorate, about 16 weight percent aluminum and about 16 weight percent of a binder consisting of D.E.R. 332 epoxy resin and polybutylene glycol diamine (nominal molecular weight 1000). The ammonium perchlorate was a mixture of 70 percent ground, nominal size of ~50–70 microns and about 30 percent as received which had a nominal particle size of about 150 microns. The aluminum fuel was Alcoa-123. The epoxide equivalent/AHE ratio of the binder components was 0.65.

In preparing the rocket motor, a mixer fitted with a heating means and vibrator was charged with the binder components and aluminum, a solids feed hopper being filled with the ammonium perchlorate. The mixer was purged three times with substantially anhydrous nitrogen, after which the mixer was started. The temperature of the mixer was raised to 60° C. and the aluminum and ammonium perchlorate blended for about 20 minutes. After this period, the ammonium perchlorate, under a reduced pressure, was introduced into the mixer. The resulting mass was mixed for an additional 17 minutes at 60° C. under the reduced pressure, i.e. substantially in vacuo, after which time the vibrator was started, the mixing being continued. After another 5 minutes, the resulting blend was cast into a motor.

The mix proved to be readily castable. The propellant containing motor was placed in a circulating oven at about 60° for a period of time and later finally cured at 80° C.

The resulting cured motor burned smoothly and completely.

Sensitivity measurements on a separate sample of the cured propellant showed autoignition at a temperature of higher than 315° C. The electrostatic spark sensitivity was greater than 18.75 joules. The measured impact sensitivity was 121.3 kg. cm.

Strand burning data showed the formulation produced a smooth burning rate curve between 500 and 1500 pounds per square inch pressure with a burning rate of 0.38 inch/second at 1000 pounds per square inch.

The density of the propellant was measured and found to be 1.8 grams/cubic centimeter.

(b) In a second study, a propellant of 68 weight percent of ammonium perchlorate, same particulation as used for the preceding run, 16 weight percent of the R-123 aluminum, and 16 weight percent of a binder of D.E.R. 332 epoxy resin and polybutylene glycol diamine (nominal molecular weight ~500) at an epoxide/AHE ratio of 0.5 was blended and cured.

Strand burning data indicated a smooth burning rate curve between 500 and 1250 pounds per square inch pressure with a burning rate of ~0.35 inch per second at 1000 pounds per square inch.

(c) In a third preparation, a 10 gram fuel sample was formulated using the same ammonium perchlorate particulation (68 weight percent), R-123 aluminum (16 weight percent) and a binder of polybutylene glycol diamine (nominal molecular weight about 500) and D.E.R. 732 epoxy binder at an epoxide/AHE ratio of 1.

The resulting cured product after 17 hours at 80° C. was a substantially void free, rubbery, tough solid grain.

(d) A propellant composition was formulated by blending in a similar manner as set forth hereinbefore, 3.4 grams ammonium perchlorate (52% ground–48% as received), 0.8 gram R-123 aluminum, 0.21 gram D.E.R. 332 epoxy resin and 0.59 gram polypropyleneglycol diamine (nominal molecular weight about 2000). This provides an epoxide/AHE ratio of about 1. This propellant was fluid and readily castable at room temperature. It gelled in 6 hours at 80° C. and was well-cured after 24 hours at 80° C. The cured propellant gain was rubbery, flexible and tough thus being indicative of a good propellant product.

(e) A tough, rubbery propellant grain was prepared from the 70% ground/30% as received particulated ammonium perchlorate (68 weight percent), R-123 aluminum (16 weight percent) polypropylene glycol diamine (nominal molecular weight ~1200) (9.4 weight percent) and an epoxy resin based on novolak (66 weight percent). This provides an epoxide/AHE ratio of about 1. The blend cured in about 20 hours at a cure temperature of about 75° C.

In a manner similar to that described for the foregoing examples, propellant grains can be formulated with other fuels and oxidizers using binder prepared from the polyglycol diamines and curing agents as set forth and described herein.

Various modifications can be made in the present invention without departing from the spirit or scope thereof for it is understood that we limit ourselves only as defined in the appended claims.

We claim:

1. A solid propellant composition comprising a particulate solid fuel, oxidizer and a binder, said fuel being a member selected from the group consisting of aluminum, magnesium, beryllium and solid light metal hydrides, said oxidizer being a member selected from the group consisting of ammonium perchlorate, ammonium nitrate, hydrazinium diperchlorate, hydrazinium perchlorate, hydrazinium nitroformate and triaminoguanidinium azide, said binder consisting of a cross-linked amine terminated polyglycol reaction product of a diamine terminated polyglycol and a cross-linking agent selected from the group consisting of an epoxy based resin, an aziridine resin or a strong Lewis acid catalyst, the concentration of said binder in said propellant ranging from about 10 to about 50 percent of the total composition weight and the fuel-oxidizer components including binder being present in a weight ratio of from about 0.8 to about 1.2 of that required stoichiometrically for fuel oxidizer balance in said propellant composition.

2. The propellant composition as defined in claim 1 wherein the fuel is particulate aluminum, the oxidizer is particulate ammonium perchlorate and the binder is the reaction product of an amine terminated polyethylene-, polypropylene- or polybutylene glycol having a molecular weight of from about 200 to about 2000 and epoxy based cross-linking agent for the amine terminated polyglycol, the ratio of said cross-linking agent to said amine terminated polyglycol based on an epoxide equivalent/amine hydrogen equivalent ranging from about 0.5 to about 2.5.

3. The propellant composition as defined in claim 2 wherein the fuel oxidizer ratio including binder is about stoichiometric of that required for a fuel oxidizer balance and the epoxide equivalent/amine hydrogen equivalent ratio in said binder ranges from about 0.5 to about 1.25.

4. A solid propellant composition which comprises particulate aluminum, said aluminum being about 16 weight percent of the total composition, ammonium perchlorate, said ammonium perchlorate being about 68 weight percent of the total composition and a binder, said binder being the cross-linked reaction product of a polybutylene glycol diamine and an epoxy resin, said binder being about 16 weight percent of the propellant composition, the epoxide equivalent/amine hydrogen equivalent ratio in said binder ranging from about 0.5 to about 1.

5. A solid propellant composition which comprises particulate aluminum, said aluminum being about 16 weight percent of the total composition, ammonium perchlorate, said ammonium perchlorate being about 68 weight percent of the total composition and a binder, said binder being the cross-linked reaction product of a polypropylene glycol diamine and an epoxy resin, said binder being about 16 weight percent of the propellant composition, the epoxide equivalent/amine hydrogen equivalent ratio in said binder being about 1.0.

References Cited

UNITED STATES PATENTS

| | | | |
|---|---|---|---|
| 3,141,294 | 7/1964 | Lawrence et al. | 149—19 |
| 3,147,161 | 9/1964 | Abere et al. | 149—19 |
| 3,245,849 | 4/1966 | Klager et al. | 149—19 |
| 3,296,043 | 1/1967 | Fluke et al. | 149—19 |

BENJAMIN R. PADGETT, Primary Examiner

U.S. Cl. X.R.

149—22, 36, 42, 43, 44